(12) United States Patent
Short (10) Patent No.: US 11,344,933 B2
(45) Date of Patent: May 31, 2022

(54) KITS FOR DISPOSING OF LIQUID PHARMACEUTICALS AND DISSOLVED SOLID PHARMACEUTICALS

(71) Applicant: Star Liberty LLC, Carlsbad, CA (US)

(72) Inventor: Gregg R. Short, Carlsbad, CA (US)

( * ) Notice: Subject to any disclaimer, the term of this patent is extended or adjusted under 35 U.S.C. 154(b) by 529 days.

(21) Appl. No.: 16/367,629

(22) Filed: Mar. 28, 2019

(65) Prior Publication Data

US 2019/0381542 A1 Dec. 19, 2019

Related U.S. Application Data (60) Provisional application No. 62/712,620, filed on Jul. 31, 2018, provisional application No. 62/684,392, filed on Jun. 13, 2018.

(51) Int. Cl.

| | |
|---|---|
| *B09B 3/00* | (2022.01) |
| *B09B 3/10* | (2022.01) |
| *A62D 3/33* | (2007.01) |
| *B01J 20/10* | (2006.01) |
| *B01J 20/12* | (2006.01) |
| *B01J 20/20* | (2006.01) |
| *B01J 20/24* | (2006.01) |
| *B01J 20/28* | (2006.01) |

(52) U.S. Cl.
CPC .............. *B09B 3/10* (2022.01); *A62D 3/33* (2013.01); *B01J 20/103* (2013.01); *B01J 20/12* (2013.01); *B01J 20/20* (2013.01); *B01J 20/24* (2013.01); *B01J 20/28023* (2013.01); *B01J 20/28045* (2013.01); *B09B 3/0075* (2013.01)

(58) Field of Classification Search
CPC ....... B09B 3/00; B09B 3/0008; B09B 3/0075; A62D 3/33; B01J 20/103; B01J 20/12; B01J 20/20; B01J 20/24; B01J 20/28023; B01J 20/28045
USPC ........................................................ 588/315
See application file for complete search history.

(56) References Cited

U.S. PATENT DOCUMENTS

| | | | |
|---|---|---|---|
| 2004/0237790 A1* | 12/2004 | von Blucher | B01J 20/28019 96/154 |
| 2012/0024724 A1 | 2/2012 | Beardsall et al. | |
| 2013/0085312 A1 | 4/2013 | Fowler et al. | |
| 2015/0231433 A1 | 8/2015 | Short | |
| 2017/0252502 A1* | 9/2017 | Ward | B01J 20/3242 |

OTHER PUBLICATIONS

PCT/US2019/024535 International Search Report and Written Opinion, dated May 24, 2019.

* cited by examiner

*Primary Examiner* — Edward M Johnson
(74) *Attorney, Agent, or Firm* — Withers & Keys, LLC (57) ABSTRACT

Methods of disposing of pharmaceuticals including liquid pharmaceuticals and dissolved solid pharmaceuticals are disclosed. The methods relate to depositing one or more liquid pharmaceuticals into or onto a substrate that includes (a)(i) fibers, or (ii) both fibers and foam, and (b) activated carbon. The substrate adsorbs active pharmaceutical ingredients and absorbs a carrier liquid to facilitate safe disposal of the one or more liquid pharmaceuticals. Pharmaceutical disposal kits suitable for disposing of liquid pharmaceuticals and dissolved solid pharmaceuticals are also disclosed. The pharmaceutical disposal kits include a substrate that (1) includes (a)(i) fibers or (ii) both fibers and foam, and (b) activated carbon, and (2) is capable of adsorbing active pharmaceutical ingredients and absorbing a carrier liquid to facilitate safe disposal of the one or more liquid pharmaceuticals.

18 Claims, 3 Drawing Sheets

Fig. 12

KITS FOR DISPOSING OF LIQUID PHARMACEUTICALS AND DISSOLVED SOLID PHARMACEUTICALS

CROSS-REFERENCE TO RELATED APPLICATIONS

This patent application claims the benefit of priority to (i) U.S. Provisional Patent Application Ser. No. 62/684,392 filed on Jun. 13, 2018 and entitled "KITS AND METHODS FOR DISPOSING OF LIQUID PHARMACEUTICALS AND DISSOLVED SOLID PHARMACEUTICALS," and (ii) U.S. Provisional Patent Application Ser. No. 62/712,620 filed on Jul. 31, 2018 and entitled "KITS AND METHODS FOR DISPOSING OF LIQUID PHARMACEUTICALS AND DISSOLVED SOLID PHARMACEUTICALS," the subject matter of both of which is hereby incorporated by reference in their entirety.

FIELD OF THE INVENTION

The present invention relates generally to methods of disposing of liquid pharmaceuticals and dissolved solid pharmaceuticals. The present invention further relates to pharmaceutical disposal kits that may be used in the disclosed methods of disposing of liquid pharmaceuticals and dissolved solid pharmaceuticals and/or sharps.

BACKGROUND OF THE INVENTION

Methods of disposing of solid pharmaceuticals and liquid pharmaceuticals, such as in a home, medical or hospital environment, typically comprise disposing of the pharmaceuticals in a waste basket with or without any packaging, squirting into a sink or in a waste container, flushing down toilet, etc. Such conventional methods of disposing of pharmaceuticals create an unsafe, environmentally-unfriendly distribution of discarded pharmaceuticals.

There is a need in the art for simple, effective, safe and environmentally-friendly pharmaceutical disposal kits, as well as methods of disposing of liquid and dissolved pharmaceuticals.

SUMMARY OF THE INVENTION

The present invention is directed to simple, effective, safe and environmentally-friendly methods of disposing of pharmaceuticals. The disclosed methods of disposing of pharmaceuticals efficiently and safely enable proper disposal of pharmaceuticals. The disclosed pharmaceutical disposal systems provide a cost-effective and convenient method of properly disposing of pharmaceuticals.

In the broadest sense, the present invention involves compositions, devices, kits and methods for collecting, dissolving, adsorbing, inactivating, destroying and/or disposing of pharmaceuticals.

In one exemplary embodiment, the method of disposing of liquid pharmaceuticals comprises depositing one or more liquid pharmaceuticals into or onto a substrate comprising (a)(i) fibers, (ii) foam, or (iii) both fibers and foam, and (b) activated carbon. The step of depositing one or more liquid pharmaceuticals into or onto the substrate may comprise, for example, using a syringe to input one or more liquid pharmaceuticals into or onto the substrate.

In another exemplary embodiment, the method of disposing of liquid pharmaceuticals comprises depositing one or more liquid pharmaceuticals into or onto a substrate comprising (a)(i) fibers, (ii) foam, or (iii) both fibers and foam, and (b) activated carbon, the substrate being proximate to, on, or within a container.

The present invention is also directed to liquid pharmaceutical disposal kits for home use. In one exemplary embodiment, the pharmaceutical disposal kit comprises a substrate comprising (a)(i) fibers, (ii) foam, or (iii) both fibers and foam, and (b) activated carbon. The step of depositing one or more liquid pharmaceuticals into or onto the substrate may comprise, for example, using a syringe to input one or more liquid pharmaceuticals into or onto the substrate.

The present invention is further directed to methods of disposing of home generated solid pharmaceuticals, wherein the method comprises disposing of solid pharmaceuticals within a substrate comprising (a)(i) fibers, (ii) foam, or (iii) both fibers and foam, and (b) activated carbon. The step of depositing solid pharmaceuticals onto the substrate comprises: mixing the solid pharmaceutical with water to dissolve the solid pharmaceutical in, for example, a pill container, and then pouring the mixture onto the substrate, which can then be placed within a sealable container (e.g., a ZIPLOC™ baggy). In other embodiments, the substrate itself is foldable into a configuration for disposal.

The present invention is further directed to methods of disposing of pharmaceuticals. In one exemplary embodiment, the method of disposing of pharmaceuticals comprises: depositing one or more liquid pharmaceuticals and dissolved solid pharmaceuticals within and/or on a substrate comprising (a)(i) fibers, (ii) foam, or (iii) both fibers and foam, and (b) activated carbon, the substrate being proximate to, on, or within a container; and depositing one or more additional liquid pharmaceuticals, dissolved solid pharmaceuticals, or any combination thereof into the container. In some embodiments, the substrate further comprises a color change "stripe" that undergoes a color change when combined with the effective amount of liquid. For example, the "stripe" would undergo a color change when combined with an effective amount of liquid pharmaceuticals and/or liquid in which is the dissolved solid pharmaceuticals.

The present invention is further directed to other pharmaceutical disposal kits for home or office use. In one embodiment, the pharmaceutical disposal kit comprises: a substrate comprising (a)(i) fibers, (ii) foam (not shown), or (iii) both fibers and foam, and (b) activated carbon; and (c) a container comprising: a container housing surrounding a container volume, a container opening providing access to the container volume from outside the container housing, and a movable container housing closure member sized to extend over and cover the container opening, wherein the substrate is proximate, on or within the container. Exemplary containers include, but are not limited to, a plastic jug, a pill bottle, etc.

In other embodiments, the pharmaceutical disposal kit comprises: (I) a container comprising: a container housing surrounding a container volume, a container opening providing access to the container volume from outside the container housing, and a movable container housing closure member sized to extend over and cover the container opening; and (II) a mixture within container, the mixture comprising: (i) water occupying at least a portion of the container volume, (ii) activated carbon, (iii) a first monomeric component capable of polymerization when combined with an effective amount of a polymerization initiator, and (iv) an optional colorant that causes the mixture to undergo a color change upon polymerization of the first monomeric component.

The present invention is further directed to other method of disposing of liquids and/or solid pharmaceuticals. In one embodiment, the method of disposing of solid pharmaceuticals comprises a method of disposing of solid pharmaceuticals (e.g., pills, transdermal patches, etc.), wherein the method comprises: partially filling a pill bottle containing discardable (i.e., unused or expired) solid pharmaceuticals with water; and pouring/placing a solidifying composition into the pill bottle, the solidifying composition comprising (a) activated carbon and (b)(i) a gelling agent (not shown), (ii) superabsorbent particles, (iii) a polymerizable composition comprising a first monomeric component that is capable of polymerization when combined with an effective amount of a polymerization initiator, or (iv) any combination of (i), (ii), and (iii).

In other embodiments, the method of disposing of liquids and/or solid pharmaceuticals comprises: depositing one or more pharmaceuticals into a container containing (i) a first monomeric component, (ii) activated carbon and (iii) water, the first monomeric component being capable of polymerization when combined with an effective amount of a polymerization initiator. In some embodiments, the container may further contain a colorant that causes the mixture within the container to undergo a color change upon polymerization of the first monomeric component The present invention is further directed to pharmaceutical and/or sharps disposal kits. In one embodiment, the pharmaceutical and/or sharps disposal kit comprises: (I) a container comprising: a container housing surrounding a container volume, a container opening providing access to the container volume from outside the container housing, and a movable container housing closure member sized to extend over and cover the container opening; and (II) a mixture within the container, the mixture comprising: (i) water occupying at least a portion of the container volume, (ii) activated carbon, (iii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is further directed to method of disposing of pharmaceutical and/or sharps. In one embodiment, the method of disposing of pharmaceutical and/or sharps comprises: depositing one or more pharmaceuticals, one or more syringes, one or more needles, one or more of the herein-described substrates comprising activated carbon, or any combination thereof into a container containing a mixture of: (i) water and (ii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is even further directed to other solid pharmaceutical disposal kits comprising: a solidifying composition, the solidifying composition comprising activated carbon and (i) a gelling agent (not shown), (ii) superabsorbent particles, (iii) a first monomeric component that is capable of polymerization when combined with an effective amount of a polymerization initiator, (iv) an optional colorant, the colorant enabling the mixture to undergo a color change when combined with the effective amount of the polymerization initiator, or (v) any combination of (i), (ii), (iii) and (iv).

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

The present invention is directed to methods of disposing of pharmaceuticals. The present invention is further directed to pharmaceutical disposal kits.

I. Methods of Disposing of Pharmaceuticals

The present invention is directed to methods of disposing of liquid pharmaceuticals and dissolved solid pharmaceuticals 20. FIGS. 1-12 depict exemplary pharmaceutical disposal kit components such as substrate 100 that may be used in the methods of the present invention.

As discussed above, the method of disposing of liquid pharmaceuticals and dissolved solid pharmaceuticals 20 may comprise disposing of one or more liquid pharmaceuticals and/or dissolved solid pharmaceuticals 20 into and/or onto a substrate 100. The substrate 100 may have any number of possible configurations such as those shown in FIGS. 1-8B. It should be understood that substrate 100 may comprise any number of layers of materials, combinations of materials, and layer configurations, such as those described herein, so as to dispose of liquid pharmaceuticals and dissolved solid pharmaceuticals 20.

II. Home and Professional Pharmaceutical Disposal Kits

The present invention is also directed to pharmaceutical disposal kits for use in a professional setting and/or a home setting. FIGS. 1-12 depict exemplary pharmaceutical disposal components such as substrate 100 and container 200 that may be used in the pharmaceutical disposal kits of the present invention.

The present invention will be further described in the following additional embodiments, examples, and claims.

Additional Embodiments

Methods of Disposing of Liquid Pharmaceuticals

1. A method of disposing of liquid pharmaceuticals 10 (or dissolved solid pharmaceuticals 20 in, e.g., water), said method comprising: depositing one or more liquid pharmaceuticals 10 into or onto a substrate 100 comprising (a)(i) fibers 18, (ii) foam (not shown), or (iii) both fibers 18 and foam, and (b) activated carbon 11. As used in these additional embodiments, the term "liquid pharmaceuticals" is used to encompass liquid pharmaceuticals, as well as solid pharmaceuticals 20 that have been dissolved in a solvent such as water. In addition, the activated carbon mentioned throughout the present description may be any commercially available activated carbon. Suitable activated carbon includes, but is not limited to, activated carbon commercially available from General Carbon Corporation (Paterson, N.J.); Parchem Fine & Specialty Chemicals (New Rochelle, N.Y.), or any other activated carbon supplier. Typically, the activated carbon is present as a fine powder or particles.

2. The method of embodiment 1, wherein the substrate 100 comprises fibers 18.

3. The method of embodiment 1 or 2, wherein the substrate 100 comprises at least one fiber-containing layer 110. See, for example, FIG. 1, which shows a single layer 110 with activated carbon 11 disbursed throughout the single layer 110.

4. The method of any one of embodiments 1 to 3, wherein the substrate 100 comprises two or more fiber-containing layers 110. See, for example, FIG. 3, which shows two layers 110 with a layer of activated carbon 111 positioned between the two layers 110. It should be understood that, in other embodiments, two layers of activated carbon 111 may be positioned on opposite sides of a single layer 110 of fiber 18, foam or both.

5. The method of any one of embodiments 1 to 4, wherein the substrate 100 comprises one or more nonwoven layers 110, one or more paper layers 110, one or more woven layers 110, one or more knit layers 110, or any combination thereof.

6. The method of any one of embodiments 1 to 5, wherein the substrate 100 comprises one or more nonwoven layers 110.

7. The method of any one of embodiments 1 to 6, wherein the substrate 100 comprises foam (not shown).

8. The method of any one of embodiments 1 to 7, wherein the substrate 100 comprises at least one foam-containing layer 110. See again, for example, FIG. 1, which shows a single layer 110 with activated carbon 11 disbursed throughout the single layer 110.

9. The method of any one of embodiments 1 to 8, wherein the substrate 100 comprises two or more foam-containing layers 110.

10. The method of any one of embodiments 1 to 9, wherein the substrate 100 comprises an outermost fiber-containing layer 110.

11. The method of any one of embodiments 1 to 10, wherein the substrate 100 comprises an outermost foam-containing layer 110.

12. The method of any one of embodiments 1 to 10, wherein the substrate 100 comprises an outermost non-penetrable layer 112 (e.g., one that a needle cannot push thru such as a hard plastic layer, a film layer, an epoxy layer, a metal layer, etc.). See, for example, substrate 100 shown in FIGS. 3, 5 and 7. Suitable outermost non-penetrable film layers 112 include, but are not limited to, liquid impermeable polyethylene film, liquid impermeable polypropylene film, etc.

13. The method of any one of embodiments 1 to 12, wherein the activated carbon 11 is present as a layer of activated carbon 111. See, for example, substrate 100 shown in FIGS. 2-7.

14. The method of any one of embodiments 1 to 13, wherein the activated carbon 11 is present as a layer of activated carbon 111 extending along an outer surface 120 of the substrate 100. See, for example, substrate 100 shown in FIGS. 2 and 4.

15. The method of any one of embodiments 1 to 14, wherein the activated carbon 11 is present as a layer of activated carbon 111 extending within the substrate 100 and positioned a distance from opposite major outer surfaces 120/121 of the substrate 100. See, for example, substrate 100 shown in FIGS. 3-5.

16. The method of any one of embodiments 1 to 15, wherein the activated carbon 11 is present as two or more layers of activated carbon 111. See, for example, substrate 100 shown in FIG. 4.

17. The method of any one of embodiments 1 to 16, wherein the activated carbon 11 is present within two or more layers 110/111/112 of the substrate 100.

18. The method of any one of embodiments 1 to 17, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

19. The method of any one of embodiments 1 to 18, wherein the activated carbon 11 is not present within at least one layer 110/112 of the substrate 100.

20. The method of any one of embodiments 1 to 19, wherein the substrate 100 further comprises (c) (i) a gelling agent (not shown), (ii) superabsorbent particles 19, or (iii) both a gelling agent and superabsorbent particles 19. See, for example, substrate 100 shown in FIGS. 3 and 6-7. Suitable gelling agents include, but are not limited to, acacia, alginic acid, bentonite, carbomers, carboxymethyl cellulose, ethylcellulose, gelatin, hydroxyethyl cellulose, hydroxypropyl cellulose, magnesium aluminum silicate, methylcellulose, poloxamers, polyvinyl alcohol, sodium alginate, tragacanth, and xanthan gum. Suitable superabsorbent particles 19 include, but are not limited to, superabsorbent particles used in diapers. See, for example, superabsorbent particles described in U.S. Pat. No. 4,076,663 issued Feb. 28, 1978 to Masuda et al.; U.S. Pat. No. 4,286,082 issued Aug. 25, 1981 to Tsubakimoto et al.; U.S. Pat. No. 4,062,817 issued Dec. 13, 1977 to Westerman; U.S. Pat. No. 4,340,706 issued Jul. 20, 1982 to Obayashi et al.; and U.S. Pat. No. 6,646,179 issued Nov. 11, 2003 to Melius et al. Suitable commercially available superabsorbent materials include, but are not limited to, superabsorbent materials available from Evonik Industries (Greensboro, N.C.) and Dow Chemical (Midland, Mich.).

21. The method of embodiment 20, wherein the gelling agent is present as a layer of gelling agent 114.

22. The method of embodiment 20 or 21, wherein the gelling agent is present as a layer of gelling agent 114 extending along an outer surface 120/121/122/123 of the substrate 100.

23. The method of any one of embodiments 20 to 22, wherein the gelling agent is present as a layer of gelling agent 114 extending within the substrate 100 and positioned a distance from opposite major outer surfaces 120/121 of the substrate 100.

24. The method of any one of embodiments 20 to 23, wherein the gelling agent is present as two or more layers of gelling agent 114.

25. The method of any one of embodiments 20 to 24, wherein the gelling agent is present within two or more layers 110/111/112/114 of the substrate 100.

26. The method of any one of embodiments 20 to 25, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

27. The method of any one of embodiments 20 to 26, wherein the gelling agent extends along one or more outer surfaces 120/121/122/123 of the substrate 100. See, outer surfaces 120/121/122/123 of substrate 100 shown in FIG. 5.

28. The method of any one of embodiments 20 to 27, wherein the gelling agent extends along all outer surfaces 120/122/123 of the substrate 100 except an upper surface 121.

29. The method of any one of embodiments 20 to 28, wherein the superabsorbent particles 19 are present as a layer of superabsorbent particles 114. See, for example, substrate 100 shown in FIGS. 3 and 6-7.

30. The method of any one of embodiments 20 to 29, wherein the superabsorbent particles 19 are present as a layer of superabsorbent particles 114 extending along an outer surface 120/121/122/123 of the substrate 100.

31. The method of any one of embodiments 20 to 30, wherein the superabsorbent particles 19 are present as a layer of superabsorbent particles 114 extending within the substrate 100 and positioned a distance from opposite major outer surfaces 120/121 of the substrate 100. See again, for example, substrate 100 shown in FIGS. 6-7.

32. The method of any one of embodiments 20 to 31, wherein the superabsorbent particles 19 are present as two or more layers 114 of superabsorbent particles.

33. The method of any one of embodiments 20 to 32, wherein the superabsorbent particles 19 are present within two or more layers 110/111/112/114 of the substrate 100.

34. The method of any one of embodiments 20 to 33, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

35. The method of any one of embodiments 20 to 34, wherein the superabsorbent particles 19 extend along one or more outer surfaces 120/121/122/123 of the substrate 100.

36. The method of any one of embodiments 20 to 35, wherein the superabsorbent particles 19 extend along all outer surfaces 120/122/123 of the substrate 100 except an upper surface 121.

37. The method of any one of embodiments 20, 29 and 31, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

38. The method of embodiment 37, wherein the two layers of the activated carbon are positioned along opposite sides of the layer of superabsorbent particles.

39. The method of embodiment 38 or 39, wherein the two layers of the activated carbon and the layer of superabsorbent particles are bonded to one another with the layer of superabsorbent particles being sandwiched between the two layers of the activated carbon.

40. The method of any one of embodiments 37 to 39, wherein the substrate comprises two outermost fiber-containing layers with one outermost fiber-containing layer being positioned along opposite major outer surfaces of the substrate.

41. The method of embodiment 40, wherein each of the two outermost fiber-containing layers comprises a nonwoven layer.

42. The method of any one of embodiments 37 to 39, wherein the substrate comprises an outermost non-penetrable layer positioned along an opposite major outer surface from said outermost fiber-containing layer of the substrate. See, for example, substrate 100 shown in FIG. 6.

43. The method of embodiment 42, wherein (i) the outermost non-penetrable layer comprises a film layer, and (ii) the outermost fiber-containing layer comprises a nonwoven layer. See, for example, substrate 100 shown in FIG. 7.

44. The method of any one of embodiments 1 to 42, wherein the substrate 100 further comprises a stripe 130 that undergoes a color change when exposed to a color-changing liquid. See, for example, substrate 100 shown in FIGS. 6A-6B.

45. The method of embodiment 44, wherein the color-changing liquid is water.

46. The method of embodiment 44, wherein the color-changing liquid is the one or more liquid pharmaceuticals 10.

47. The method of any one of embodiments 44 to 46, wherein said depositing step causes the stripe of the stripe 130 to undergo a color change.

48. The method of any one of embodiments 1 to 47, further comprising positioning the substrate 100 proximate to, on, or within a container 200. See, exemplary container 200 shown in FIGS. 9A and 9B.

49. The method of any one of embodiments 1 to 48, further comprising positioning the substrate 100 proximate to a container 200.

50. The method of any one of embodiments 1 to 49, further comprising positioning the substrate 100 on a container 200. For example, substrate 100 may be adhesively attached to an outer surface 201 of container 200 via an adhesive layer 115 (see FIG. 3). It should be understood that any method or means of attaching substrate 100 to an outer surface 201 of container 200 may be utilized. After use, substrate 100 may be removed from outer surface 201 of container 200 and inputted into a container volume 202 within container 200.

51. The method of any one of embodiments 1 to 50, further comprising positioning the substrate 100 within a container 200.

52. The method of any one of embodiments 48 to 51, wherein the container 100 comprises: a container housing 203 surrounding a container volume 202, a container opening 204 providing access to the container volume 202 from outside the container housing 203, and a movable container housing closure member 205 sized to extend over and cover the container opening 204.

53. The method of any one of embodiments 48 to 52, wherein said method further comprises: depositing one or more syringes 30, one or more needles 31, or any combination thereof into the container 200. As discussed above, after use, substrate 100 (with one or more liquid pharmaceuticals 10 therein or thereon) may be positioned in container volume 202 within container 200.

54. The method of any one of embodiments 1 to 53, wherein said depositing step comprises using a syringe 30 to incorporate the one or more liquid pharmaceuticals 10 into or onto the substrate 100. In other embodiments, the depositing step may comprise pouring the one or more liquid pharmaceuticals 10 onto an upper surface 121 of the substrate 100.

55. The method of any one of embodiments 1 to 54, wherein one or more layers of the substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) and (ii) deters or prevents recovery of the liquid pharmaceuticals 10 (or dissolved solid pharmaceuticals 20 in, e.g., water), or (C) both (A) and (B). For example, (a) one or more additional absorbent materials (not shown), (b) one or more materials (not shown) that (i) bind or chemically alter the liquid pharmaceuticals 10 (or dissolved solid pharmaceuticals 20 in, e.g., water) and (ii) deter or prevent recovery of the liquid pharmaceuticals 10 (or dissolved solid pharmaceuticals 20 in, e.g., water), or (c) both (a) and (b) could be present in any one or all of: (i) the one or more fiber-containing layers 110, (ii) the one or more layers containing activated carbon 111, (iii) the one or more layers containing superabsorbent particles 114, or (iv) any combination of (i), (ii) and (iii).

Pharmaceutical Disposal Kits

56. A pharmaceutical disposal kit 1000 suitable for use in the method of any one of embodiments 1 to 55, said kit 1000 comprising: the substrate 100 comprising (a)(i) fibers 18, (ii) foam, or (iii) both fibers 18 and foam, and (b) activated carbon 11.

57. A pharmaceutical disposal kit 1000 comprising: a substrate 100 comprising (a)(i) fibers 18, (ii) foam (not shown), or (iii) both fibers 18 and foam, and (b) activated carbon 11.

58. The pharmaceutical disposal kit 1000 of embodiment 56 or 57, wherein the substrate 100 comprises fibers 18.

59. The pharmaceutical disposal kit 1000 of any one of embodiments 56 to 58, wherein the substrate 100 comprises at least one fiber-containing layer 110.

60. The pharmaceutical disposal kit 1000 of any one of embodiments 56 to 59, wherein the substrate 100 comprises two or more fiber-containing layers 110.

61. The pharmaceutical disposal kit 1000 of any one of embodiments 56 to 60, wherein the substrate 100 comprises one or more nonwoven layers 110, one or more paper layers 110, one or more woven layers 110, one or more knit layers 110, or any combination thereof.

62. The pharmaceutical disposal kit 1000 of any one of embodiments 56 to 61, wherein said substrate 100 comprises one or more nonwoven layers 110.

63. The pharmaceutical disposal kit 1000 of any one of embodiments 56 to 62, wherein said substrate 100 comprises foam (not shown).

64. The pharmaceutical disposal kit 1000 of any one of embodiments 56 to 63, wherein said substrate 100 comprises at least one foam-containing layer 110.

65. The pharmaceutical disposal kit 1000 of any one of embodiments 56 to 64, wherein said substrate 100 comprises two or more foam-containing layers 110.

66. The pharmaceutical disposal kit 1000 of any one of embodiments 56 to 65, wherein said substrate 100 comprises an outermost fiber-containing layer 110.

67. The pharmaceutical disposal kit 1000 of any one of embodiments 56 to 66, wherein said substrate 100 comprises an outermost foam-containing layer 110.

68. The pharmaceutical disposal kit 1000 of any one of embodiments 56 to 66, wherein said substrate 100 comprises an outermost non-penetrable layer 112 (e.g., one that a needle cannot push thru, for example, a film layer, a liquid impermeable polymer film layer, an epoxy layer, a metal layer, a hard plastic layer, or combinations thereof).

Figure 1:
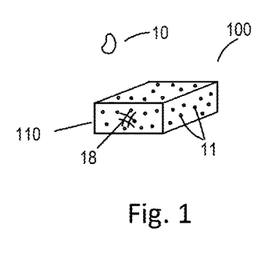
FIG. 1 depicts a perspective view of an exemplary substrate suitable for use in pharmaceutical disposal kits of the present invention.
Figure 2:
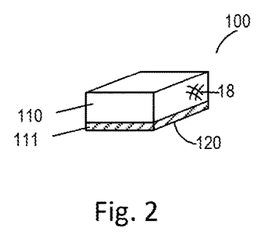
FIG. 2 depicts a perspective view of another exemplary substrate suitable for use in pharmaceutical disposal kits of the present invention.
Figure 3:
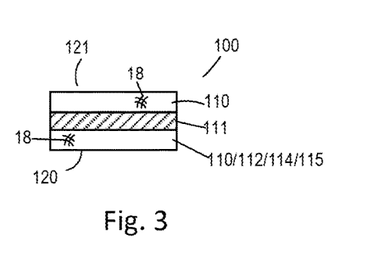
FIG. 3 depicts a side view of another exemplary substrate suitable for use in pharmaceutical disposal kits of the present invention.
Figure 4:
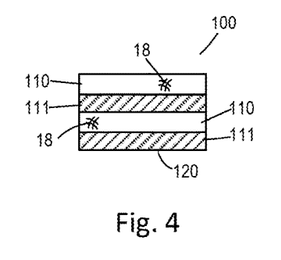
FIG. 4 depicts a side view of another exemplary substrate suitable for use in pharmaceutical disposal kits of the present invention.
Figure 5:
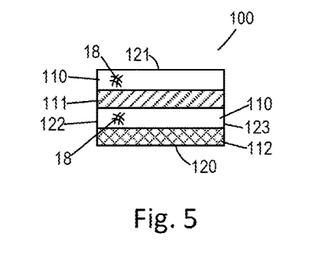
FIG. 5 depicts a side view of another exemplary substrate suitable for use in pharmaceutical disposal kits of the present invention.
Figure 6:
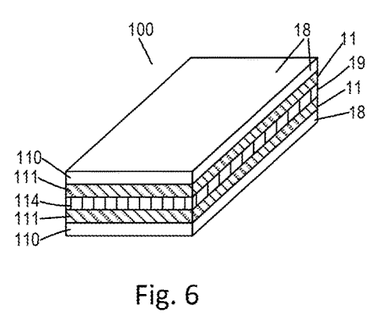
FIG. 6 depicts a perspective view of another exemplary substrate suitable for use in pharmaceutical disposal kits of the present invention.
Figure 7:
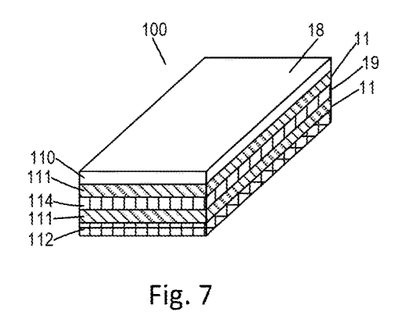
FIG. 7 depicts a perspective view of another exemplary substrate suitable for use in pharmaceutical disposal kits of the present invention.
Figure 8A:
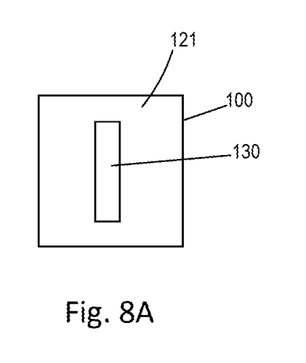
FIGS. 8A and 8B depict a top views of another exemplary substrate with a color change stripe thereon, with one color change stripe having no color (FIG. 8A) and the other color change stripe having a visible color (FIG. 8B) after effective amount of liquid is added to the substrate.
Figure 8B:
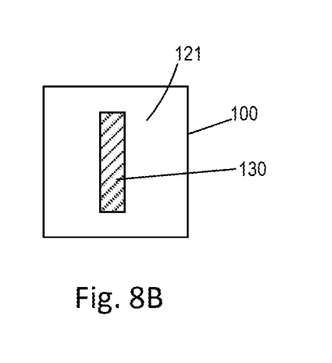
Figure 9A:
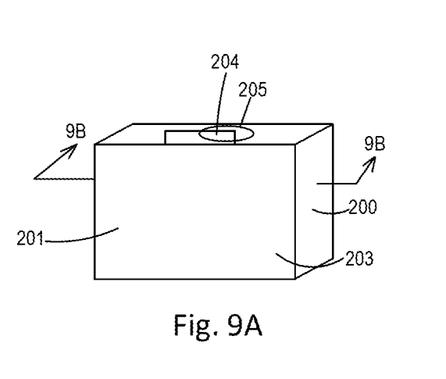
FIG. 9A depicts an exemplary container suitable for use in pharmaceutical disposal kits of the present invention.
Figure 9B:
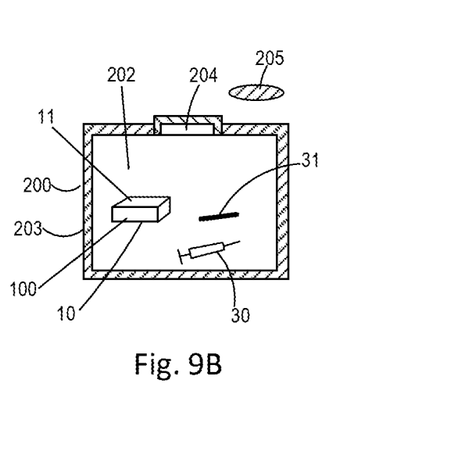
FIG. 9B depicts a cross-sectional view of the exemplary container shown in FIG. 7A as viewed along line 9B-9B shown in FIG. 9A.
Figures 10, 11A, 11B, 12:
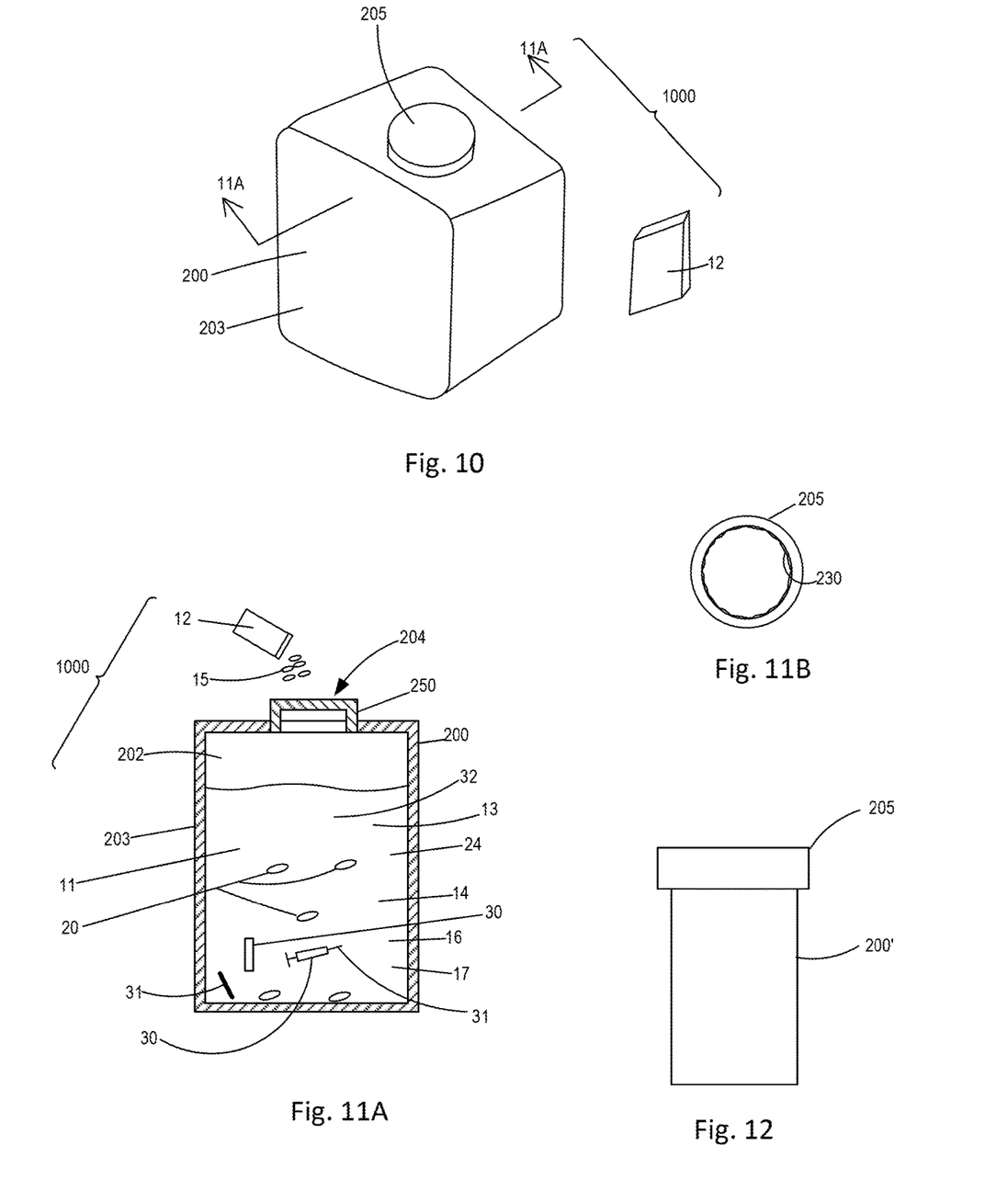
FIG. 10 depicts a perspective view of another exemplary pharmaceutical and/or sharps disposal kit of the present invention.
FIG. 11A depicts a cross-sectional view of the exemplary container shown in the exemplary pharmaceutical and/or sharps disposal kit of FIG. 10 as view along line 11A-11A shown in FIG. 10.
FIG. 11B depicts a bottom view of an exemplary container housing closure member for use with the exemplary container shown in FIGS. 10-11A.
FIG. 12 depicts a perspective view of another exemplary container for use in the pharmaceutical disposal kits of the present invention.

69. The pharmaceutical disposal kit 1000 of any one of embodiments 56 to 68, wherein the activated carbon 11 is present as a layer of activated carbon 111. As shown in FIG. 1, alternatively, the activated carbon 11 may be disbursed throughout a layer containing other substrate components such as fibers 18, foam or both.

70. The pharmaceutical disposal kit 1000 of any one of embodiments 56 to 69, wherein the activated carbon 11 is present as a layer of activated carbon 111 extending along an outer surface 120/121/122/123 of said substrate 100.

71. The pharmaceutical disposal kit 1000 of any one of embodiments 56 to 69, wherein the activated carbon 11 is present as a layer of activated carbon 111 extending within said substrate 100 and positioned a distance from opposite major outer surfaces 120/121 of said substrate 100.

72. The pharmaceutical disposal kit 1000 of any one of embodiments 56 to 71, wherein the activated carbon 11 is present as two or more layers of activated carbon 111.

73. The pharmaceutical disposal kit 1000 of any one of embodiments 56 to 72, wherein the activated carbon 11 is present within two or more layers 110/111/112 of the substrate 100.

74. The pharmaceutical disposal kit 1000 of any one of embodiments 56 to 73, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

75. The pharmaceutical disposal kit 1000 of any one of embodiments 56 to 74, wherein the activated carbon 11 is not present within at least one layer 110/112 of the substrate 100.

76. The pharmaceutical disposal kit 1000 of any one of embodiments 56 to 75, wherein the substrate 100 further comprises (c) (i) a gelling agent (not shown), (ii) superabsorbent particles 19, or (iii) both a gelling agent and superabsorbent particles 19. It should be understood that other absorbent materials may be used in combination with, or instead of, the superabsorbent particles 19. Other absorbent materials include both (I) naturally-occurring absorbent materials such as (a) naturally-occurring inorganic materials such as clay, sand, and volcanic ash cotton fibers, (b) naturally-occurring organic materials such as cotton fibers, and (II) synthetic absorbent materials such as polymer sponges, other hydrophilic materials.

77. The pharmaceutical disposal kit 1000 of embodiment 76, wherein the gelling agent is present as a layer of gelling agent 114.

78. The pharmaceutical disposal kit 1000 of embodiment 76 or 77, wherein the gelling agent is present as a layer of gelling agent 114 extending along an outer surface 120/121/122/123 of said substrate 100.

79. The pharmaceutical disposal kit 1000 of any one of embodiments 76 to 78, wherein the gelling agent is present as a layer of gelling agent 114 extending within the substrate 100 and positioned a distance from opposite major outer surfaces 120/121 of the substrate 100.

80. The pharmaceutical disposal kit 1000 of any one of embodiments 76 to 79, wherein the gelling agent is present as two or more layers of gelling agent 114.

81. The pharmaceutical disposal kit 1000 of any one of embodiments 76 to 80, wherein the gelling agent is present within two or more layers 110/111/112/114 of the substrate 100.

82. The pharmaceutical disposal kit 1000 of any one of embodiments 76 to 81, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

83. The pharmaceutical disposal kit 1000 of any one of embodiments 76 to 82, wherein the gelling agent extends along one or more outer surfaces 120/121/122/123 of the substrate 100.

84. The pharmaceutical disposal kit 1000 of any one of embodiments 76 to 83, wherein the gelling agent extends along all outer surfaces 120/122/123 of the substrate 100 except an upper surface 121.

85. The pharmaceutical disposal kit 1000 of any one of embodiments 76 to 84, wherein the superabsorbent particles 19 are present as a layer of superabsorbent particles 114.

86. The pharmaceutical disposal kit 1000 of any one of embodiments 76 to 85, wherein the superabsorbent particles 19 are present as a layer of superabsorbent particles 114 extending along an outer surface 120/121/122/123 of said substrate 100.

87. The pharmaceutical disposal kit 1000 of any one of embodiments 76 to 86, wherein the superabsorbent particles 19 are present as a layer of superabsorbent particles 114 extending within the substrate 100 and positioned a distance from opposite major outer surfaces 120/121 of the substrate 100.

88. The pharmaceutical disposal kit 1000 of any one of embodiments 76 to 87, wherein the superabsorbent particles 19 are present as two or more layers of superabsorbent particles 114.

89. The pharmaceutical disposal kit 1000 of any one of embodiments 76 to 88, wherein the superabsorbent particles 19 are present within two or more layers 110/111/112/114 of the substrate 100.

90. The pharmaceutical disposal kit 1000 of any one of embodiments 76 to 89, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

91. The pharmaceutical disposal kit 1000 of any one of embodiments 76 to 90, wherein the superabsorbent particles 19 extend along one or more outer surfaces 120/121/122/123 of the substrate 100.

92. The pharmaceutical disposal kit 1000 of any one of embodiments 76 to 91, wherein the superabsorbent particles 19 extend along all outer surfaces 120/122/123 of the substrate 100 except an upper surface 121.

93. The pharmaceutical disposal kit 1000 of any one of embodiments 85, 87 and 90, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

94. The pharmaceutical disposal kit 1000 of embodiment 93, wherein the two layers of the activated carbon are positioned along opposite sides of the layer of superabsorbent particles.

95. The pharmaceutical disposal kit 1000 of embodiment 93 or 94, wherein the two layers of the activated carbon and the layer of superabsorbent particles are bonded to one another with the layer of superabsorbent particles being sandwiched between the two layers of the activated carbon.

96. The pharmaceutical disposal kit 1000 of any one of embodiments 93 to 95, wherein the substrate comprises two outermost fiber-containing layers with one outermost fiber-containing layer being positioned along opposite major outer surfaces of the substrate.

97. The pharmaceutical disposal kit 1000 of embodiment 96, wherein each of the two outermost fiber-containing layers comprises a nonwoven layer.

98. The pharmaceutical disposal kit 1000 of any one of embodiments 93 to 95, wherein the substrate comprises an outermost non-penetrable layer positioned along an opposite major outer surface from said outermost fiber-containing layer of the substrate. See, for example, substrate 100 shown in FIG. 6.

99. The pharmaceutical disposal kit 1000 of embodiment 98, wherein (i) the outermost non-penetrable layer comprises a film layer, and (ii) the outermost fiber-containing layer comprises a nonwoven layer. See, for example, substrate 100 shown in FIG. 7.

100. The pharmaceutical disposal kit 1000 of any one of embodiments 56 to 99, wherein the substrate 100 further comprises a stripe 130 that undergoes a color change when exposed to a color-changing liquid. It should be understood that stripe 130 may have any shape (e.g., rectangular, square, star-shaped, circular, etc.) and be positioned at any location along substrate 100 (e.g., any outer surface or underneath a clear layer of substrate 100 if present).

101. The pharmaceutical disposal kit 1000 of embodiment 100, wherein the color-changing liquid is water.

102. The pharmaceutical disposal kit 1000 of embodiment 100, wherein the color-changing liquid is the one or more liquid pharmaceuticals 10.

103. The pharmaceutical disposal kit 1000 of any one of embodiments 100 to 102, wherein incorporating one or more liquid pharmaceuticals 10 or dissolved solid pharmaceuticals 20 into or onto the substrate 100 causes the stripe 130 of the substrate 100 to undergo a color change.

104. The pharmaceutical disposal kit 1000 of any one of embodiments 56 to 103, further comprising: a liquid pharmaceutical 10 (or dissolved solid pharmaceuticals 20 in, e.g., water), on or within the substrate 100.

105. The pharmaceutical disposal kit 1000 of any one of embodiments 56 to 104, further comprising: a container 200.

106. The pharmaceutical disposal kit 1000 of any one of embodiments 56 to 105, further comprising: a container 200, wherein the substrate 100 is positioned proximate, on or within the container 200.

107. The pharmaceutical disposal kit 1000 of embodiment 106, wherein the substrate 100 is proximate the container 200.

108. The pharmaceutical disposal kit 1000 of embodiment 106 or 107, wherein the substrate 100 is on the container 200.

109. The pharmaceutical disposal kit 1000 of any one of embodiments 106 to 108, wherein the substrate 100 is within the container 200.

110. The pharmaceutical disposal kit 1000 of any one of embodiments 105 to 109, further comprising: one or more syringes 30, one or more needles 31, or any combination thereof within the container.

111. The pharmaceutical disposal kit 1000 of any one of embodiments 105 to 110, wherein the container 200 comprises: a container housing 203 surrounding a container volume 202, a container opening 204 providing access to the container volume 202 from outside the container housing 203, and a movable container housing closure member 205 sized to extend over and cover the container opening 204.

112. A pharmaceutical disposal kit 1000 comprising: a substrate 100 comprising (a)(i) fibers 18, (ii) foam (not shown), or (iii) both fibers and foam, and (b) activated carbon 11; and (c) a container 200 comprising: a container housing 203 surrounding a container volume 202, a container opening 204 providing access to said container volume 202 from outside said container housing 203, and a movable container housing closure member 205 sized to extend over and cover said container opening 204, wherein said substrate 100 is proximate, on or within said container 200.

113. The pharmaceutical disposal kit 1000 of embodiment 112, wherein the substrate 100 is proximate the container 200.

114. The pharmaceutical disposal kit 1000 of embodiment 112 or 113, wherein the substrate 100 is on the container 200.

115. The pharmaceutical disposal kit 1000 of any one of embodiments 112 to 114, wherein the substrate 100 is within the container 200.

116. The pharmaceutical disposal kit 1000 of any one of embodiments 112 to 115, wherein the substrate 100 further comprises a stripe 130 that undergoes a color change when exposed to a color-changing liquid.

117. The pharmaceutical disposal kit 1000 of embodiment 116, wherein the color-changing liquid is water.

118. The pharmaceutical disposal kit 1000 of embodiment 116, wherein the color-changing liquid is the one or more liquid pharmaceuticals 10.

119. The pharmaceutical disposal kit 1000 of any one of embodiments 116 to 118, wherein the stripe 130 is positioned along an upper surface 121 of the substrate 100.

120. The pharmaceutical disposal kit 1000 of any one of embodiments 112 to 119, wherein said stripe 130 undergoes a color change when said stripe 130 is contacted with a liquid pharmaceutical 10 or dissolved solid pharmaceuticals 20 in water 14.

121. The pharmaceutical disposal kit 1000 of any one of embodiments 112 to 120, wherein said container 200 further comprises one or more syringes 30, one or more needles 31, or any combination thereof.

122. The pharmaceutical disposal kit 1000 of any one of embodiments 112 to 121, further comprising: a liquid pharmaceutical 10 on or within the substrate 100.

123. The pharmaceutical disposal kit 1000 of any one of embodiments 56 to 107, wherein the substrate 100 further comprises: one or more adhesive layers 115 to enable substrate 100 to be adhered to a surface (e.g., an outer surface 201 of container 200).

124. The pharmaceutical disposal kit 1000 of embodiment 123, wherein the substrate 100 further comprises: a release liner (not shown) over an exposable adhesive layer 115.

125. The pharmaceutical disposal kit 1000 of any one of embodiments 56 to 124, wherein one or more layers of said substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) and (ii) deters or prevents recovery of the liquid pharmaceuticals 10 (or dissolved solid pharmaceuticals 20 in, e.g., water), or (C) both (A) and (B).

It should be understood that although substrate 100 is shown as having one or more layers, as shown in FIGS. 1-7, substrate 100 may further comprise any number of additional layers in addition to those shown in the figures. For example, in some embodiments, any of the above-described substrate 100 may be at least partially, or completely, encased within a permeable outer cover (not shown). The permeable outer cover may comprise a permeable material alone, such as a nonwoven (or woven or knit) fabric layer, or may comprise a combination of a permeable material and an impermeable material. For example, the permeable outer cover may comprise a permeable top/upper layer (e.g., a nonwoven fabric layer) and an impermeable bottom/lower layer (e.g., a nonwoven fabric layer coated and/or impregnated with an impermeable coating/impregnant such as a rubber-based composition, or a rubber or polymeric film layer) with any sides connecting the permeable top/upper layer to the impermeable bottom/lower layer, when present, comprising either a permeable or impermeable material.

Additional Methods of Disposing of Solid Pharmaceuticals

126. A method of disposing of solid pharmaceuticals 20 (e.g., pills, transdermal patches, etc.), said method comprising: partially filling a pill bottle containing discardable (i.e., unused or expired) solid pharmaceuticals 20 with water; and pouring/placing a solidifying composition into the pill bottle 200/200', the solidifying composition comprising (a) activated carbon and (b)(i) a gelling agent (not shown), (ii) superabsorbent particles 19, (iii) a polymerizable composition comprising a first monomeric component 13 that is capable of polymerization when combined with an effective amount of a polymerization initiator 15, or (iv) any combination of (i), (ii), and (iii). Suitable first monomeric components 13 and polymerization initiators 15 include any of those described herein.

127. The method of embodiment 126, wherein the activated carbon is incorporated within the gelling agent. In some embodiments, the gelling agent may be impregnated with activated carbon 11. In some embodiments, the superabsorbent particles 19 may be impregnated with activated carbon 11.

128. The method of embodiment 126 or 127, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

129. The method of any one of embodiments 126 to 128, further comprising: capping the pill bottle 200/200'; and shaking contents within the pill bottle 200/200'.

130. A method of disposing of liquid/solid pharmaceuticals 10/20, said method comprising: depositing one or more pharmaceuticals 10/20 or the substrate 100 of any one of embodiments 56 to 125 into a container 200 containing (i) a first monomeric component 13 and (ii) water 14, the first monomeric component 13 being capable of polymerization when combined with an effective amount of a polymerization initiator 15.

131. The method of embodiment 130, wherein the first monomeric component 13 comprises an acrylic or acrylamide monomer.

132. The method of embodiment 130 or 131, wherein the first monomeric component 13 comprises an acrylic monomer having the structure:

wherein:
R$^1$ is —COOH, —COOR$^5$, —CONHOH, —CONHCH$_2$OH, or —CONH$_2$;
R$^2$ is —H, —CH$_3$, CH$_3$CH$_2$—, or —CN;
each of R$^3$ and R$^4$ is independently —H, —CH$_3$, CH$_3$CH$_2$—, or a halogen; and
R$^5$ is a C$_{1-12}$alkyl, a C$_{1-12}$alkoxyalkyl, a C$_{1-12}$hydroxyalkyl, an acrylamide, or an alkylene-bis-acrylamide.

133. The method of any one of embodiments 130 to 132, wherein the first monomeric component 13 comprises N-methylolacrylamide, acrylic acid, acrylamide, an acrylic ester, or acrylonitrile.

134. The method of any one of embodiments 130 to 133, wherein the first monomeric component 13 comprises N-methylolacrylamide.

135. The method of any one of embodiments 130 to 134, wherein the container 200 further comprises a reducing agent 16 mixed with (i) the activated carbon 11, (ii) the first monomeric component 13 and (iii) the water 14.

136. The method of embodiment 135, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

137. The method of embodiment 130 or 136, wherein the reducing agent 16 comprises a tertiary amine comprising tetramethylethylenediamine, N,N-dimethyl-toluedine or N,N-dihydroxyethyl-paratoluedine.

138. The method of any one of embodiments 130 to 137, wherein the container 200 further comprises a free radical scavenger 17 mixed with (i) the activated carbon 11, (ii) the first monomeric component 13 and (iii) the water 14.

139. The method of embodiment 138, wherein the free radical scavenger 17 comprises hydroquinone, monoethyl ether of hydroquinone, butylated hydroxyanisole, butylated hydroxytoluene, and t-butyl hydroquinone.

140. The method of any one of embodiments 130 to 139, wherein the container 200 further comprises one or more pharmaceuticals 20 within (i) the activated carbon 11, (ii) the first monomeric component 13 and (iii) the water 14.

141. The method of any one of embodiments 130 to 140, further comprising: incorporating the polymerization initiator 15 into the container 200 in an effective amount to cause polymerization of the first monomeric component 13.

142. The method of any one of embodiments 130 to 141, wherein the polymerization initiator 15 comprises zinc formaldehyde sulfoxylate, ammonium persulfate, a peroxide, or a perborate.

143. The method of any one of embodiments 130 to 142, wherein the polymerization initiator 15 comprises zinc formaldehyde sulfoxylate.

144. The method of any one of embodiments 130 to 143, wherein the container 200 comprises: a container housing 203 surrounding a container volume 202, a container opening 204 providing access to the container volume 202 from outside the container housing 203, and a movable container housing closure member 205 sized to extend over and cover the container opening 204.

145. The method of embodiments 141 to 144, wherein said incorporating step causes a mixture 24 within the container 200 to undergo a color change.

146. The method of any one of embodiments 130 to 145, wherein the container 200 further comprises a colorant 32 in addition to (i) the activated carbon 11, (ii) the first monomeric component 13 and (iii) the water 14.

147. The method of any one of embodiments 130 to 146, wherein the container 200 further comprises a colorant 32 in addition to (i) the first monomeric component 13 and (iii) the water 14, the colorant 32 comprising a red dye.

148. The method of embodiment 147, wherein said incorporating step causes the water 14 within the container 200 to undergo a color change from a red color to a yellow/orange color (or a weak yellow color or an opaque colorless solid).

149. The method of any one of embodiments 130 to 148, wherein said method further comprises: depositing one or more syringes 30, one or more needles 31, one or more substrate 100 of any one of embodiments 48 to 87, or any combination thereof into the container 200.

150. The method of any one of embodiments 130 to 149, wherein the container 200 further comprises one or more of, or all of: (i) the first monomeric component 13, (ii) the water 14, (iv) reducing agent 16, (v) the free radical scavenger 17, (vi) one or more substrates 100 of any one of embodiments 56 to 125, and (vii) the colorant 32, separate from or in combination with, (viii) an effective amount of the polymerization initiator 15 as recited in any one of embodiments 141 to 143.

Pharmaceutical Disposal Kits

151. A pharmaceutical disposal kit 1000 comprising: (I) a container 200 comprising: a container housing 203 surrounding a container volume 202, a container opening 204 providing access to said container volume 202 from outside said container housing 203, and a movable container housing closure member 205 sized to extend over and cover said container opening 204; and (II) a mixture 24 within container 200, said mixture 24 comprising: (i) water 14 occupying at least a portion of said container volume 202, (ii) optionally activated carbon 11, and (iii) a first monomeric component 13 capable of polymerization when combined with an effective amount of a polymerization initiator 15. During use, mixture 24 may further comprise (III) at least one pharmaceutical 20 within said mixture 24. Pharmaceutical disposal kit 1000 may further comprise an optional wall or under-the-counter mounting device for mounting container 200 along a wall surface or under a counter. As discussed above, movable container housing closure member 205 may be in the form of a safety cap 205 to prevent a user's hand from extending into container 200.

152. The pharmaceutical disposal kit 1000 of embodiment 151, wherein said first monomeric component 13 comprises an acrylic or acrylamide monomer.

153. The pharmaceutical disposal kit 1000 of embodiment 151 or 152, wherein said first monomeric component 13 comprises an acrylic monomer having the structure:

$$(R^1)(R^2)C=C(R^3)(R^4)$$

wherein:
$R^1$ is —COOH, —COOR$^5$, —CONHOH, —CONHCH$_2$OH, or —CONH$_2$;
$R^2$ is —H, —CH$_3$, CH$_3$CH$_2$—, or —CN;
each of $R^3$ and $R^4$ is independently —H, —CH$_3$, CH$_3$CH$_2$—, or a halogen; and
$R^5$ is a C$_{1-12}$alkyl, a C$_{1-12}$alkoxyalkyl, a C$_{1-12}$hydroxyalkyl, an acrylamide, or an alkylene-bis-acrylamide.

154. The pharmaceutical disposal kit 1000 of any one of embodiments 151 to 153, wherein said first monomeric component 13 comprises N-methylolacrylamide, acrylic acid, acrylamide, an acrylic ester, or acrylonitrile.

155. The pharmaceutical disposal kit 1000 of any one of embodiments 151 to 154, wherein said first monomeric component 13 comprises N-methylolacrylamide.

156. The pharmaceutical disposal kit 1000 of any one of embodiments 151 to 155, wherein said container 200 further comprises a reducing agent 16 mixed with (i) said first monomeric component 13, (ii) said optional activated carbon 11, and (iii) said water 14.

157. The pharmaceutical disposal kit 1000 of embodiment 156, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

158. The pharmaceutical disposal kit 1000 of embodiment 156 or 157, wherein said reducing agent 16 comprises a tertiary amine comprising, tetramethylethylenediamine, N,N-dimethyl-toluedine or N,N-dihydroxyethyl-paratoluedine.

159. The pharmaceutical disposal kit 1000 of any one of embodiments 151 to 158, wherein said container 200 further comprises a free radical scavenger 17 mixed with (i) said first monomeric component 13, (ii) said optional activated carbon 11, and (iii) said water 14.

160. The pharmaceutical disposal kit 1000 of embodiment 159, wherein said free radical scavenger 17 comprises hydroquinone, monoethyl ether of hydroquinone, butylated hydroxyanisole, butylated hydroxytoluene, and t-butyl hydroquinone.

161. The pharmaceutical disposal kit 1000 of any one of embodiments 151 to 160, wherein said container 200 further comprises a polymerization initiator 15 in an effective amount to cause polymerization of said first monomeric component 13.

162. The pharmaceutical disposal kit 1000 of embodiment 161, wherein said polymerization initiator 15 comprises zinc formaldehyde sulfoxylate, ammonium persulfate, a peroxide, or a perborate.

163. The pharmaceutical disposal kit 1000 of embodiment 161 or 162, wherein said polymerization initiator 15 comprises zinc formaldehyde sulfoxylate.

164. The pharmaceutical disposal kit 1000 of any one of embodiments 151 to 163, wherein said container volume 202 comprises up to about ten gallons (or any amount in increments of 0.1 gallons up to 10.0 gallons).

165. The pharmaceutical disposal kit 1000 of any one of embodiments 151 to 164, wherein said container volume 202 comprises from about 1.0 to about 5.0 gallons (or any amount in increments of 0.1 gallons between 1.1 and 4.9 gallons).

166. The pharmaceutical disposal kit 1000 of any one of embodiments 151 to 165, wherein said movable container housing closure member 205 comprises a removable lid 205 having lid engaging members 230 that engage with corresponding housing engaging members 250.

167. The pharmaceutical disposal kit 1000 of any one of embodiments 161 to 166, wherein said polymerization initiator 15 is packaged separately from said first monomeric component 13 prior to being combined with said first monomeric component 13.

168. The pharmaceutical disposal kit 1000 of embodiment 167, wherein said polymerization initiator 15 is packaged within a plastic bag or container 12.

169. The pharmaceutical disposal kit 1000 of any one of embodiments 151 to 168, wherein said mixture 24 further comprises a colorant 32.

170. The pharmaceutical disposal kit 1000 of embodiment 169, wherein said colorant 32 comprises a red dye.

171. The pharmaceutical disposal kit 1000 of embodiment 169 or 170, wherein said colorant 32 undergoes a color change when said mixture 24 is contacted with said polymerization initiator 15.

172. The pharmaceutical disposal kit 1000 of any one of embodiments 151 to 171, wherein said mixture 24 further comprises one or more syringes 30, one or more needles 31, one or more substrates 100 of any one of embodiments 56 to 125, or any combination thereof.

Pharmaceutical and/or Sharps Disposal Kits

173. A pharmaceutical and/or sharps disposal kit 1000 comprising: (I) a container 200 comprising: a container housing 203 surrounding a container volume 202, a container opening 205 providing access to said container volume 202 from outside said container housing 203, and a movable container housing closure member 205 sized to extend over and cover said container opening 204; and (II) a mixture 24 within said container 200, said mixture 24 comprising: (i) water 14 occupying at least a portion of said container volume 202, (ii) optionally activated carbon 11, (iii) a first monomeric component 13 capable of polymerization when combined with an effective amount of a polymerization initiator 15, and (iv) an optional colorant 32, said colorant 32 enabling said mixture 24 to undergo a color change when combined with said effective amount of said polymerization initiator 15.

174. The pharmaceutical and/or sharps disposal kit 1000 of embodiment 173, wherein said first monomeric component 13 comprises an acrylic or acrylamide monomer.

175. The pharmaceutical and/or sharps disposal kit 1000 of embodiment 173 or 174, wherein said first monomeric component 13 comprises an acrylic monomer having the structure:

$$(R^1)(R^2)C=C(R^3)(R^4)$$

wherein:
$R^1$ is —COOH, —COOR$^5$, —CONHOH, —CONHCH$_2$OH, or —CONH$_2$;
$R^2$ is —H, —CH$_3$, CH$_3$CH$_2$—, or —CN;
each of $R^3$ and $R^4$ is independently —H, —CH$_3$, CH$_3$CH$_2$—, or a halogen; and
$R^5$ is a C$_{1-12}$alkyl, a C$_{1-12}$alkoxyalkyl, a C$_{1-12}$hydroxyalkyl, an acrylamide, or an alkylene-bis-acrylamide.

176. The pharmaceutical and/or sharps disposal kit 1000 of any one of embodiments 173 to 175, wherein said first monomeric component 13 comprises N-methylolacrylamide, acrylic acid, acrylamide, an acrylic ester, or acrylonitrile.

177. The pharmaceutical and/or sharps disposal kit 1000 of any one of embodiments 173 to 176, wherein said first monomeric component 13 comprises N-methylolacrylamide.

178. The pharmaceutical and/or sharps disposal kit 1000 of any one of embodiments 173 to 177, wherein said mixture 24 further comprises a reducing agent 16 mixed with (i) said first monomeric component 13, (ii) said optional activated carbon 11, (iii) said water 14 and (iv) said colorant 32.

179. The pharmaceutical and/or sharps disposal kit 1000 of embodiment 178, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

180. The pharmaceutical and/or sharps disposal kit 1000 of embodiment 178 or 179, wherein said reducing agent 16 comprises a tertiary amine comprising tetramethylethylenediamine, N,N-dimethyl-toluedine or N,N-dihydroxyethyl-paratoluedine.

181. The pharmaceutical and/or sharps disposal kit 1000 of any one of embodiments 173 to 180, wherein said mixture 24 further comprises a free radical scavenger 17 mixed with (i) said first monomeric component 13, (ii) said optional activated carbon 11, (iii) said water 14 and (iv) said colorant 32.

182. The pharmaceutical and/or sharps disposal kit 1000 of embodiment 181, wherein said free radical scavenger 17 comprises hydroquinone, monoethyl ether of hydroquinone, butylated hydroxyanisole, butylated hydroxytoluene, and t-butyl hydroquinone.

183. The pharmaceutical and/or sharps disposal kit 1000 of any one of embodiments 173 to 182, wherein said colorant 32 comprises a red dye 32.

184. The pharmaceutical and/or sharps disposal kit 1000 of embodiment 183, wherein said red dye 32 enables a color change of said mixture 24 from a red color to a yellow/orange color when combined with said effective amount of said polymerization initiator 15.

185. The pharmaceutical and/or sharps disposal kit 1000 of any one of embodiments 173 to 184, wherein said container 200 further comprises a polymerization initiator 15 in an effective amount to cause polymerization of said first monomeric component 13.

186. The pharmaceutical and/or sharps disposal kit 1000 of embodiment 185, wherein said polymerization initiator 15 comprises zinc formaldehyde sulfoxylate, ammonium persulfate, a peroxide, or a perborate.

187. The pharmaceutical and/or sharps disposal kit 1000 of embodiment 185 or 186, wherein said polymerization initiator 15 comprises zinc formaldehyde sulfoxylate.

188. The pharmaceutical and/or sharps disposal kit 1000 of any one of embodiments 173 to 187, wherein said container volume 202 comprises up to about ten gallons.

189. The pharmaceutical and/or sharps disposal kit 1000 of any one of embodiments 173 to 188, wherein said container volume 202 comprises from about 1.0 to about 5.0 gallons.

190. The pharmaceutical and/or sharps disposal kit 1000 of any one of embodiments 173 to 189, wherein said movable container housing closure member 205 comprises a removable lid 205 having lid engaging members 230 that engage with corresponding housing engaging members 250.

191. The pharmaceutical and/or sharps disposal kit 1000 of any one of embodiments 185 to 190, wherein said polymerization initiator 15 is packaged separately from said first monomeric component 13 prior to being combined with said first monomeric component 13.

192. The pharmaceutical and/or sharps disposal kit 1000 of embodiment 191, wherein said polymerization initiator 15 is packaged within a plastic bag or container 12.

193. The pharmaceutical and/or sharps disposal kit 1000 of any one of embodiments 173 to 192, wherein said container 200 further comprises one or more pharmaceuticals 20, one or more syringes 30, one or more needles 31, one or more substrates 100 of any one of embodiments 56 to 125, or any combination thereof within said mixture 24.

194. The pharmaceutical and/or sharps disposal kit 1000 of any one of embodiments 173 to 193, wherein said container 200 further comprises one or more syringes 30, one or more needles 31, one or more substrates 100 of any one of embodiments 55 to 123, or any combination thereof within said mixture 24.

195. The pharmaceutical and/or sharps disposal kit 1000 of any one of embodiments 173 to 194, wherein said container 200 further comprises one or more pharmaceuticals 20 within said mixture 24.

196. The pharmaceutical and/or sharps disposal kit 1000 of any one of embodiments 105 to 125, wherein said container 200 further comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 130 to 143.

Methods of Disposing of Pharmaceuticals and/or Sharps

197. A method of disposing of pharmaceutical 20 and/or sharps 30/31, said method comprising: depositing one or more pharmaceuticals 20, one or more syringes 30, one or more needles 31, one or more substrates 100 of any one of embodiments 56 to 125, or any combination thereof into a container 200 containing a mixture 24 of: (i) water 14, (ii) optional activated carbon 11, (iii) a first monomeric component 13 capable of polymerization when combined with an effective amount of a polymerization initiator 15, and (iv) an optional colorant 32, the colorant 32 enabling the mixture 24 to undergo a color change when combined with the effective amount of the polymerization initiator 15.

198. The method of embodiment 197, wherein the first monomeric component 13 comprises an acrylic or acrylamide monomer.

199. The method of embodiment 197 or 198, wherein the first monomeric component 13 comprises an acrylic monomer having the structure:

wherein:
R$^1$ is —COOH, —COOR$^5$, —CONHOH, —CONHCH$_2$OH, or —CONH$_2$;
R$^2$ is —H, —CH$_3$, CH$_3$CH$_2$—, or —CN;
each of R$^3$ and R$^4$ is independently —H, —CH$_3$, CH$_3$CH$_2$—, or a halogen; and
R$^5$ is a C$_{1-12}$alkyl, a C$_{1-12}$alkoxyalkyl, a C$_{1-12}$hydroxyalkyl, an acrylamide, or an alkylene-bis-acrylamide.

200. The method of any one of embodiments 197 to 199, wherein the first monomeric component 13 comprises N-methylolacrylamide, acrylic acid, acrylamide, an acrylic ester, or acrylonitrile.

201. The method of any one of embodiments 197 to 200, wherein the first monomeric component 13 comprises N-methylolacrylamide.

202. The method of any one of embodiments 197 to 201, wherein the mixture 24 further comprises a reducing agent 16 mixed with (i) the first monomeric component 13, (ii) the optional activated carbon 11, (iii) the water 14, and (iv) the colorant 32.

203. The method of embodiment 202, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

204. The method of embodiment 202 or 203, wherein the reducing agent 16 comprises a tertiary amine comprising tetramethylethylenediamine, N,N-dimethyl-toluedine or N,N-dihydroxyethyl-paratoluedine.

205. The method of any one of embodiments 197 to 204, wherein the mixture 24 further comprises a free radical scavenger 17 mixed with (i) the first monomeric component 13, (ii) the optional activated carbon 11, (iii) the water 14, and (iv) the colorant 32.

206. The method of embodiment 205, wherein the free radical scavenger 17 comprises hydroquinone, monoethyl ether of hydroquinone, butylated hydroxyanisole, butylated hydroxytoluene, and t-butyl hydroquinone.

207. The method of any one of embodiments 197 to 206, wherein the mixture 24 further comprises one or more pharmaceuticals 20, one or more syringes 30, one or more needles 31, or any combination thereof.

208. The method of any one of embodiments 197 to 207, wherein the mixture 24 further comprises one or more syringes 30, one or more needles 31, or any combination thereof.

209. The method of any one of embodiments 197 to 208, wherein the mixture 24 further comprises one or more pharmaceuticals 20.

210. The method of any one of embodiments 197 to 209, wherein the colorant 32 comprises a red dye.

211. The method of any one of embodiments 197 to 210, further comprising: incorporating the polymerization initiator 15 into the container 200 in an effective amount to cause polymerization of the first monomeric component 13.

212. The method of any one of embodiments 197 to 211, wherein the polymerization initiator 15 comprises zinc formaldehyde sulfoxylate, ammonium persulfate, a peroxide, or a perborate.

213. The method of any one of embodiments 197 to 212, wherein the polymerization initiator 15 comprises zinc formaldehyde sulfoxylate.

214. The method of any one of embodiments 197 to 213, wherein the container 200 comprises: a container housing 203 surrounding a container volume 202, a container opening 204 providing access to the container volume 202 from outside the container housing 203, and a movable container housing closure member 205 sized to extend over and cover the container opening 204.

Additional Solid Pharmaceutical Disposal Kits

215. A solid pharmaceutical disposal kit comprising: a solidifying composition, the solidifying composition comprising activated carbon 11 and (i) a gelling agent (not shown), (ii) superabsorbent particles 19, (iii) a first monomeric component 13 that is capable of polymerization when combined with an effective amount of a polymerization initiator 15, or (iv) any combination of (i), (ii), and (iii). The gelling agent can be any of the above-described gelling agents or superabsorbent particles 19. Suitable first monomeric components 13 and polymerization initiators 15 include any of those described herein.

216. The solid pharmaceutical disposal kit of embodiment 215, wherein the activated carbon 11 is incorporated within the gelling agent. In some embodiments, the gelling agent may be impregnated with activated carbon 11. In some embodiments, the superabsorbent particles 19 may be impregnated with activated carbon 11. In some embodiments, the first monomeric component 13 may be combined with activated carbon 11.

217. The solid pharmaceutical disposal kit of embodiment 215 or 216, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

218. The solid pharmaceutical disposal kit of any one of embodiments 215 to 217, wherein the solidifying composition comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 130 to 143.

Pharmaceutical-Containing Compositions

219. A pharmaceutical-containing composition resulting from the method of any one of embodiments 126 to 150. In some embodiments, the pharmaceutical-containing composition comprises a liquid mixture comprising first monomeric component 13, optional activated carbon 11, water 14 and at least one pharmaceutical 20 within the liquid mixture. In other embodiments, the pharmaceutical-containing composition comprises a solid polymer matrix comprising polymerized first monomeric component 13, optional activated carbon 11, water 14 and at least one pharmaceutical 20 within the solid polymer matrix.

220. A composition resulting from the method of embodiment 219, said composition comprising (i) one or more pharmaceuticals 20, and at least one of (ii) one or more syringes 30 and (iii) one or more needles 31. In some embodiments, the composition comprises a liquid mixture 24 comprising first monomeric component 13, optional activated carbon 11, water 14, at least one pharmaceutical 20, and one or more syringes 30, one or more needles 31, or any combination within the liquid mixture 24. In other embodiments, the pharmaceutical-containing composition comprises a solid polymer matrix comprising polymerized first monomeric component 13, activated carbon 11, water 14, at least one pharmaceutical 20, and one or more syringes 30, one or more needles 31, or any combination within the solid polymer matrix.

Pharmaceutical- and/or Sharps-Containing Compositions

221. A composition resulting from the method of any one of embodiments 197 to 214. In some embodiments, the composition comprises a liquid mixture 24 comprising first monomeric component 13, optional activated carbon 11, water 14, colorant 32, and one or more of (i) one or more pharmaceuticals 20, (ii) one or more syringes 30, and (iii) one or more needles 31 within the liquid mixture 24. In other embodiments, the composition comprises a solid polymer matrix comprising polymerized first monomeric component 13, optional activated carbon 11, water 14, colorant 32, and one or more of (i) one or more pharmaceuticals 20, (ii) one or more syringes 30, (iii) one or more needles 31, and (iv) one or more substrates 100 of any one of embodiments 56 to 125 within the solid polymer matrix.

In addition, it should be understood that although the above-described pharmaceutical disposal kits and methods are described as "comprising" one or more components or steps, the above-described pharmaceutical disposal kits and methods may "comprise," "consists of," or "consist essentially of" the above-described components or steps of the pharmaceutical disposal kits and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a pharmaceutical disposal kit and/or method that "comprises" a list of elements (e.g., components or steps) is not necessarily limited to only those elements (or components or steps), but may include other elements (or components or steps) not expressly listed or inherent to the pharmaceutical disposal kit and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a pharmaceutical disposal kit and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described pharmaceutical disposal kits and/or methods may comprise, consist essentially of, or consist of any of the herein-described components and features, as shown in the figures with or without any feature(s) not shown in the figures. In other words, in some embodiments, the pharmaceutical disposal kits of the present invention do not have any additional features other than those shown in the figures, and such additional features, not shown in the figures, are specifically excluded from the pharmaceutical disposal kits. In other embodiments, the pharmaceutical disposal kits of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Pharmaceutical and/or sharps disposal kits similar to exemplary pharmaceutical and/or sharps disposal kit 1000 shown in FIGS. 1-12 were prepared and utilized in a home environment, as well as a commercial environment (e.g., a pharmacy). Each mixture within a given pharmaceutical and/or sharps disposal kit had one of the following compositions:

Formulation 1:
Water—73.8 wt %
N-methylolacrylamide—26 wt %
Sodium Nitrite—0.1 wt %
Benzotriazole—0.1 wt %
Activated Carbon—0.1 to 3.0 wt %

Formulation 2:
Water—73.75 wt %
N-methylolacrylamide—26 wt %
Sodium Nitrite—0.1 wt %
Benzotriazole—0.1 wt %
Red Dye—0.05 wt %
Activated Carbon—0.1 to 3.0 wt %

Each kit also contained a separate package of polymerization initiator comprising either ammonium persulfate or zinc formaldehyde sulfoxylate.

Upon polymerization of the mixtures of Formulation 2, the mixture turns from a red color to a yellow color (i.e., a very pale yellow; could also be described as a colorless opaque solid).

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A pharmaceutical disposal kit suitable for disposing of liquid pharmaceuticals, said kit comprising:
   a substrate comprising (a)(i) fibers or (ii) both fibers and foam, and (b) activated carbon,
   wherein the substrate comprises (1) an outermost fiber-containing layer along an upper major outer surface of the substrate, and (2) an outermost non-penetrable layer along a lower major outer surface of the substrate opposite said upper major outer surface of the substrate.

2. The pharmaceutical disposal kit of claim 1, wherein the activated carbon is present as a layer of activated carbon extending within said substrate and positioned a distance from said upper major outer surface and said lower major outer surface of said substrate.

3. The pharmaceutical disposal kit of claim 1, wherein the substrate further comprises:
   (c)(i) a gelling agent, (ii) superabsorbent particles, or (iii) both a gelling agent and superabsorbent particles.

4. The pharmaceutical disposal kit of claim 3, wherein the superabsorbent particles are present as a layer of superabsorbent particles.

5. The pharmaceutical disposal kit of claim 3, wherein (i) the superabsorbent particles are present as a layer of superabsorbent particles extending within the substrate and positioned a distance from said upper major outer surface and said lower major outer surface of the substrate, and (ii) the activated carbon is present as two layers of the activated carbon with the layer of superabsorbent particles being between the two layers of the activated carbon.

6. The pharmaceutical disposal kit of claim 1, wherein (i) the outermost non-penetrable layer comprises a rubber or polymeric film layer, and (ii) the outermost fiber-containing layer comprises a nonwoven layer.

7. The pharmaceutical disposal kit of claim 1, wherein one or more layers of said substrate comprise (A) an additional absorbent material, the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material that (i) binds or chemically alters the liquid pharmaceuticals and (ii) deters or prevents recovery of the liquid pharmaceuticals, or (C) both (A) and (B).

8. A pharmaceutical disposal kit suitable for disposing of liquid pharmaceuticals, said kit comprising:
a substrate comprising (a)(i) fibers or (ii) both fibers and foam, (b) activated carbon, and (c)(i) a gelling agent, (ii) superabsorbent particles, or (iii) both a gelling agent and superabsorbent particles,
wherein (c)(i) the gelling agent, (ii) the superabsorbent particles, or (iii) both the gelling agent and the superabsorbent particles are present as a layer of (i) the gelling agent, (ii) the superabsorbent particles, or (iii) both the gelling agent and the superabsorbent particles extending within the substrate and positioned a distance from opposite major outer surfaces of the substrate, (ii) the activated carbon is present as two layers of the activated carbon, and (iii) the substrate comprises an outermost fiber-containing layer.

9. The pharmaceutical disposal kit of claim 8, wherein the substrate comprises two outermost fiber-containing layers, the two outermost fiber-containing layers being positioned along opposite major outer surfaces of the substrate.

10. The pharmaceutical disposal kit of claim 8, wherein the substrate comprises an outermost non-penetrable layer positioned along an opposite major outer surface from said outermost fiber-containing layer of the substrate.

11. The pharmaceutical disposal kit of claim 8, wherein the two layers of the activated carbon are positioned along opposite sides of the layer of (i) the gelling agent, (ii) the superabsorbent particles, or (iii) both the gelling agent and the superabsorbent particles.

12. The pharmaceutical disposal kit of claim 11, wherein the substrate comprises an outermost non-penetrable layer positioned along an opposite major outer surface from said outermost fiber-containing layer of the substrate.

13. The pharmaceutical disposal kit of claim 8, wherein one or more layers of the substrate comprise (A) an additional absorbent material, the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material that (i) binds or chemically alters the liquid pharmaceuticals and (ii) deters or prevents recovery of the liquid pharmaceuticals, or (C) both (A) and (B).

14. The pharmaceutical disposal kit of claim 11, wherein one or more layers of the substrate comprise (A) an additional absorbent material, the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material that (i) binds or chemically alters the liquid pharmaceuticals and (ii) deters or prevents recovery of the liquid pharmaceuticals, or (C) both (A) and (B).

15. A pharmaceutical disposal kit suitable for disposing of liquid pharmaceuticals, said kit comprising:
a substrate comprising (a)(i) fibers or (ii) both fibers and foam, (b) activated carbon, and (c)(i) a gelling agent, (ii) superabsorbent particles, or (iii) both a gelling agent and superabsorbent particles,
wherein the substrate comprises (1) an outermost fiber-containing layer along at least one major outer surface of opposite major outer surfaces of the substrate, (2) a layer of the gelling agent, the superabsorbent particles, or both the gelling agent and the superabsorbent particles, and (3) two layers of the activated carbon positioned along opposite sides of the layer of the gelling agent, the superabsorbent particles, or both the gelling agent and the superabsorbent particles.

16. The pharmaceutical disposal kit of claim 15, wherein the substrate comprises two outermost fiber-containing layers, the two outermost fiber-containing layers being positioned along opposite major outer surfaces of the substrate.

17. The pharmaceutical disposal kit of claim 15, wherein the substrate comprises an outermost non-penetrable layer positioned along an opposite major outer surface from an outermost fiber-containing layer of the substrate.

18. The pharmaceutical disposal kit of claim 15, wherein the substrate further comprises a liquid pharmaceutical that is (i) disposed of, (ii) collected, (iii) dissolved, (iv) adsorbed, (v) inactivated, (vi) destroyed, or (vii) any combination of (i) to (vi), within the substrate.

* * * * *